US010274614B2

(12) United States Patent
Florido et al.

(10) Patent No.: US 10,274,614 B2
(45) Date of Patent: Apr. 30, 2019

(54) HIGH SPEED GAMMA IMAGING DEVICE

(71) Applicant: INVAP S.E., Provincia de Rio Negro (AR)

(72) Inventors: Pablo Florido, Provincia de Río Negro (AR); Eduardo Nassif, Provincia de Río Negro (AR); Manuel Argüelles, Provincia de Río Negro (AR); Federico Fernandez Baldis, Provincia de Río Negro (AR)

( * ) Notice: Subject to any disclaimer, the term of this patent is extended or adjusted under 35 U.S.C. 154(b) by 0 days.

(21) Appl. No.: 15/446,569

(22) Filed: Mar. 1, 2017

(65) Prior Publication Data

US 2017/0261623 A1 Sep. 14, 2017

(30) Foreign Application Priority Data

Mar. 8, 2016 (AR) ........................ P2016 01 00612

(51) Int. Cl.
*G01T 1/20* (2006.01)
*G01T 1/164* (2006.01)

(52) U.S. Cl.
CPC .......... *G01T 1/2018* (2013.01); *G01T 1/1648* (2013.01)

(58) Field of Classification Search
CPC .................................................... G01T 1/2018
USPC .................................................... 250/363.01
See application file for complete search history.

(56) References Cited

U.S. PATENT DOCUMENTS

| | | | | |
|---|---|---|---|---|
| 4,831,261 A * | 5/1989 | Genna | G01T 1/2985 250/363.01 |
| 6,114,702 A * | 9/2000 | Doerfel | G01T 1/1642 250/366 |
| 9,897,558 B2 * | 2/2018 | Bowdon | G01N 23/046 |
| 2010/0046690 A1 * | 2/2010 | Proctor | G01V 5/0091 376/154 |
| 2015/0320375 A1 * | 11/2015 | De Jong | A61B 6/032 378/63 |
| 2015/0323683 A1 * | 11/2015 | Vasilyev | G01V 5/107 250/269.1 |
| 2016/0003734 A1 * | 1/2016 | Mann | G01N 17/006 250/339.05 |
| 2016/0367208 A1 * | 12/2016 | Liu | A61B 6/4417 |

* cited by examiner

*Primary Examiner* — David P Porta
*Assistant Examiner* — Gisselle M Gutierrez
(74) *Attorney, Agent, or Firm* — Fay Sharpe LLP; James E. Scarbrough

(57) ABSTRACT

This invention presents a new device to produce images of the gamma field, specially designed for circumstances requiring high efficiency and fast response imaging, by applying the concept of image extraction within a given field of view, through the combination of efficient gamma radiation detectors. Each detector is located inside a shielding, with an area of the detector with no shielding to enter the incident gamma radiation detector with a plurality of angles in relation to the normal outgoing central axis to the surface of the detector through the unshielded area, where that central axis is divergent in relation to the outgoing central axes of neighboring detectors.

19 Claims, 13 Drawing Sheets

HIGH SPEED GAMMA IMAGING DEVICE

CLAIM OF PRIORITY

This application claims priority to Argentinian Patent Application No. AR P 2016 01 00612, dated Mar. 8, 2016, the entirety of which is incorporated herein by reference.

FIELD OF THE INVENTION

The main purpose of this invention submitted for an invention patent is a GAMMA RADIATION IMAGING DEVICE, especially designed for measurement under circumstances requiring imaging with high efficiency and response speed.

More specifically, this invention consists of a gamma fields imaging device, through the concept of image acquisition within a given field of view, through the combination of efficient gamma radiation detectors, where each detector is located inside a compact collimator, with a detection lobe with known overlapping and with a central axis diverging in relation to the central axes of the neighboring detection lobes.

BACKGROUND OF THE INVENTION

Given a gamma radiation field coming from specific or extensive sources (fixed or mobile) located in an open or closed space, the actual imaging of the spatial distribution of those sources of radiation is performed using the technology known as “gamma cameras”, which are available off-the-shelf.

As detailed by Kharafi in the year 2013, current gamma cameras use two types of technological approaches to imaging.

One kind of technological approach uses a segmented collimator consisting of the parallel overlay of a plurality of collimators and a certain focal point and high efficiency collimation, i.e., only radiation from a small range of angles of incidence enters the detector. The axis of each collimator converges at a certain imaginary point in front or behind the camera, creating a sort of focus of the gamma radiation. This is a position-sensitive gamma detector; this type of collimator is called “telescope”.

The other kind of approach to create the gamma image uses the position-sensitive gamma detector, inside a shielding, with a single collimator with a small entrance hole at a relatively large distance from the gamma sensor or sensors, called “pin-hole” collimator. Through the pin-hole of the collimator, each position of the sensor receives the radiation coming from a small range of angles of incidence.

FIG. 1 presents a view of a simplified diagram of both types of gamma camera devices.

Recent equipment proposed with this type of collimators can be seen, respectively, in the proposals by Enghardt et al. in 2011 and by Le Goaller in 2010.

As we can see, these cameras create the image concept making each gamma sensor have a solid detection angle towards the focal point of the gamma camera, which must be smaller as the desired spatial resolution increases. In these cameras, said resolution is high, but the detection efficiency is low because by using collimators the image is created at the expense of removing the detection of gamma radiation not aligned with the focal point, which it does that for a variety of applications the typical measurement time can be up to 10 minutes, and even more, to obtain a single complete gamma image.

Since collimators can be expensive and bulky for a variety of applications, improvements have been proposed, such as the so-called coded aperture collimators, which reduce the size of the collimator and, in turn, increase spatial resolution of the image of the gamma field. These collimators have evolved since the first proposals, such as that by Barrett in 1973, to present day when there are several gamma cameras available off-the-shelf with coded collimators, as detailed by Ivanov et al. in 2010. In open fields and subject to tests under real conditions, measurement times of more than 10 hours have been reported for a single image, as reported by the Department of Energy of the United State in 1998, applying a coded aperture camera in a certain nuclear site being dismantled.

Other methods to obtain an image, but without using collimators, as proposed by Schönfelder et al. in 1973 to investigate gamma rays for astronomical investigation purposes, which has also been developed through time for medical and scientific uses, are those using a consecutive series of detectors. The first detector performs Compton interaction, and the second works as a detector of the absorption of the outgoing gamma after Compton interaction, reconstructing the path of the incident photon in the first detector based on the separation of the signals by time of flight from both detectors, and the lobular angular response of the outgoing gamma in relation to the angle of the incident radiation. Currently, with this concept, more compact designs are yet to be achieved to use as general purpose gamma cameras, as analyzed by Ljubenov et al. in 2002, and proposed by Wonho Lee et al. in 2010, as well as by Kataoka et al. in 2013. This type of sensor has the disadvantage that the detection efficiency will be comparatively lower because it relies on simultaneous measurement of two gammas.

Although there are gamma sensor with high spatial resolution, based on the foregoing it is finally clear that general purpose gamma cameras will be slow to acquire an image in the open field, due to the low efficiency involved, and the fact that the images are blurry because the focus mechanisms used have low precision. This has been a restriction for their current use, since the equipment available are expensive, bulky and heavy, and with inconvenient features and pricing for a large number of applications.

A fast alternative to characterize a gamma field is to use several opposite detectors in quadrant arrays, separated by shielding material, such as lead or tungsten, as you can see in the proposal by Larsson et al. of 2008. Although this type of gamma detector is fast and efficient, it does not generate an image of the gamma radiation from a given field of view; instead of being a kind of gamma camera, it is a detector, by quadrants, of the measurement of the anisotropy of the gamma field.

Based on the analysis of the characteristics of current gamma cameras, these devices can be explained as concepts looking to resemble the image construction method of the human eye or current optic cameras, which are essentially based on the concept of a focus, a lens, and a position-sensitive high resolution sensor.

This technological approach to imaging (outlined in FIG. 2), has the advantage that it can be used in several of these equipment: high resolution position-sensitive detectors are already available for X-ray and Gamma ray image transmission equipment for medical and industrial applications.

But for X and Gamma ray detection with transmission technique, the source of radiation are either specific or parallel beams, which generate images with very little blur without requiring telescope or “pin-hole” collimators. To acquire gamma images from extensive sources in open spaces, the high resolution of these sensors, given the number of pixels or two-dimensional elements available to compose an image is unnecessarily high, because, due to the properties of the gamma field, changes in spatial and angular components of the actual gamma field are very small, and the image is finally very blurry, regardless of whether it is acquired with high resolution of the gamma sensor. It can be observed that this effect still appears even using the different types of collimators already mentioned, with times of up to dozens of minutes to produce one single image.

That is why there are some detectors available which are extremely slow but relatively small and low-cost, not always included in the classical literature of gamma cameras. These use a "pin-hole" collimator with an extremely small aperture, which has a single detector that is not position-sensitive, located inside the shielding and collimator, and creates the image using mechanical azimuth recording and elevation of the axis of view of the measuring head consisting of the detector and the collimator. Although they are lightweight, the measuring time for one position only can be up to 2 hours.

On the side with the longest acquisition time for gamma imaging by moving a single detector are aerial equipment with radiometric characterization for geophysical purposes, which use a single non-collimated detector with approximately 16 liters detection volume, consisting of 4 detectors in parallel, as outlined in FIG. 3. Combining commercial detectors with a 4 inches×4 inches×16 inches detection volume, they form a flat area of detection of approximately 40 cm by 40 cm sides, and an approximate 100 Kg weight for the full detector. An example of such application can be found in the report by Paasche et al. of 2003, where an image or map of gamma radiation of an area of approximately 8000 Km2 was acquired, flying 150 meters above ground in straight lines separated by 400 m over 31 flights during a month and half using two of the detectors described for geophysical measurements. This imaging method with a single sensor is also distinct because, as it is not collimated, its maximum efficiency is on the vertical over the center of the detector face, and the efficiency decreases when deviating from the regular incidence due to the decrease in geometric efficiency, as reported by Itadzu et al. in 2000. By operating as a single detector with a very large field of view and increasing height to measure the area with fewer flight hours, since the distance can be increased between flight lines, it reduces the spatial resolution of the image acquired, which is explained in detail in technical document 1363 of the International Agency of Atomic Energy of 2003.

Recently, for the purpose of searching for radioactive sources in the open field, as presented by Halevy et al. in 2014, or mapping radiation on lands adjacent to a nuclear station after an accident, as presented by Torii et al. in 2015, geophysical sensors started being used in aircrafts, helicopters and unmanned aerial vehicles. But then problem remains that the shortest measurement time requires a greater height at the expense of losing spatial resolution of the gamma image or map. Since these applications are most useful when the measurement is faster, this type of detectors present many limitations when used. The gamma cameras mentioned above cannot be applied because the measurement time is too long for a moving vehicle, whether by air or land.

In gamma cameras, collimators are necessary to create an image because, unlike visible light radiation lengths, there is no equivalent for the refraction index when transferring the gamma radiation from one medium to another, but rather the gamma radiation carries out Compton interaction, photoelectric and pair generation based on the function of the incident radiation energy, with a constant of output angles with respect to the incident radiation angle. Due to this difference in interaction depending on whether it is a visible or gamma photon, the concept of inbound and outbound beam with its angle of incidence and output is lost, which means that there is no concept directly similar to the concept of lens and focus in terms of gamma radiation.

In geophysical gamma detectors, the need to use non-collimated large detectors is due to the fact that when combining the low intensity of natural radiation with the flight speed of aerial vehicles, high detection efficiency is necessary to obtain statistics to generate the maps required in a matter of seconds.

Given the very numerous and varied needs of fast handling control of radioactive sources, safety of nuclear facilities, protection of sites, materials and people access and exit control, simple area monitors which only measure the rate of incident gamma on the detector in real time are still used, usually with Geiger counters. These detectors are widely used due to their low price, and because they have a compact and lightweight structure, and are also simple and robust.

For nuclear accidents, radioactive sources searches, or to perform geophysical gamma maps of gamma radiation, large sodium iodide scintillator detectors are still currently used as sensors, with no shielding, to transport a large volume of detectors with minimum weight.

It is clear then that it would be much more advantageous to have area monitors to perform not only the simple count of photons of gamma radiation incident on the detector, but also to create an image of the spatial distribution of the gamma radiation incident on the detector, so as to significantly contribute to detect the source of radiation. It would also be useful to perform a spectrometry, but currently existing gamma cameras are far behind as regards speed, price, volume and weight in order to compete with the everyday use of a simple Geiger counter used as an area monitor.

It is also clear that it would be much more advantageous to have meters for open images of gamma fields, which, without significantly compromising weight and volume of the equipment, can provide images in short measuring times. But, usually, there is only the alternative of using a single detector consisting of an array of scintillators.

Then, there is a real need for a device capable of performing gamma images with high efficiency within short periods of time, capable of performing a spectrometry, with compact, lightweight equipment, cost competitive even with respect to current area monitors, as well as large and lightweight to compete with geophysical detectors.

BRIEF SUMMARY OF THE INVENTION

Given the disadvantages described of the aforementioned devices and methods, this invention has been designed to solve those issues.

In other words, the purpose of the present invention is to have a device facing the challenges of gamma imaging with high efficiency and within short periods of time, considering the physical properties of gamma radiation and the statistics required to generate an image of the gamma field.

The device can be used at checkpoints, as a small head of detection, as fixed or mobile area monitor, acquiring images from the gamma radiation incident on the detector in real time, and with the possibility of performing a spectrometry of the incident radiation.

The device can also be used as a large-size detector when seeking to detect low levels of radiation, where it provides a quick, efficient and homogeneous response within the entire field of emission where it creates the image of the gamma field, both with fixed and mobile equipment, and aerial or ground vehicles.

To reach the proposed goal, the device consists of a new concept of gamma camera, formed by an array of neighboring sensors. Each sensor is an element of the image of the gamma field incident on the device, and each element efficiently and quickly detects the incident radiation within a specific detection lobe in front of it. Placing lobes as divergent with respect to a center, or various centers, or an axes, or several axes, or combinations thereof, the geometric composition of the overlapping of the detection lobes create the field of view of the gamma camera.

Each sensor is composed of a single radiation detector located inside a small shielding close to or in contact with the sensor, which does not cover the sensor in the face exposed to the detection lobe. Incoming gamma photons are preferably those which have an incidence on the face of the detector, in the direction of the detection lobe.

When sensitivity, weight, volume, and counts rate of the detector so allow and justify it, the device uses an extension projected towards the outside of the detection lobe; such extension consists of a system of small-thickness side screens, which decrease the overlapping of the sensor's detection lobe with the detection lobes from neighboring sensors, since they are formed by shielding material of the gamma radiation. The gamma of the neighboring lobes have an incidence very oblique to the surface of the screens, and therefore, although they are thin, the path of the gamma is relatively large inside each screen for gamma rays coming from the area of neighboring lobules, and therefore with small shielding thicknesses on the side screens, the overlay between neighboring lobes can be significantly reduced.

When a compact screens and short outbound projection system is required, the device uses a system with small thickness internal screens and shielding material in addition to the side screens, to minimize its influence within the detection lobe of the sensor itself, but which effectively attenuate radiation from a source located within a neighboring detection lobe.

When great sensitivity is required, the device uses large detectors so that the intrinsic efficiency of each detector is high and each detector then performs the shielding functions of the neighboring detector, because, naturally, the materials used as scintillators for a high efficiency detector have a very high intrinsic efficiency. For these requirements, each detection element of the device proposed as a gamma camera does not include, whether in whole or in part, the shielding surrounding or in contact with each detector, which results in an array of detection lobes with reduced overlapping among neighboring lobes, due to the decrease in the detection efficiency by moving away from the normal direction to the center of the face of the detector facing the detection lobe. When the resolution requires it, and potential restrictions on weight allow it, the gamma camera includes an outer shielding that surrounds each detector only for elements on the periphery of the area of view, on faces of the sensors which do not have the shielding support of neighboring detectors. If the requirements of sensitivity, weight and dimensions allow it, the gamma camera also includes side and internal screens which decrease the superimposition of neighboring lobes.

From the functional point of view, unlike previous gamma cameras, which operate by seeking to create an image through a focus and a collimator to generate an image similar to that created by a human eye or current optical cameras, this device generates the image in a way somewhat similar to the typical composed eye of a fly or other insects.

BRIEF DESCRIPTION OF DRAWINGS

In order to have a better understanding of this invention, below is a detailed description, based on the following figures, included for the sole purpose of illustrating the preferred way to implement this invention, without limiting the invention.

DETAILED DESCRIPTION OF THE INVENTION

Before proceeding to a detailed description, we can see that the creation described is not limited to the use as a detector type for a specific use, and that although the present description is shown and described as applied as a radiation monitor for fixed positions, it can be implemented in a variety of applications and sizes in different geometries and mechanical solutions, using different types of gamma detectors, for fixed or mobile applications, in order to create images of the gamma field.

The present invention presents a device capable of obtaining gamma images with high efficiency and within short periods of time, with a concept for the creation of the gamma image that can adapted to the sensitivity, speed and resolution needs of various uses. It applies a concept that is compatible with the intrinsic physical properties of the fields of gamma photons and the need to create an image at very high speed.

Figure 1:
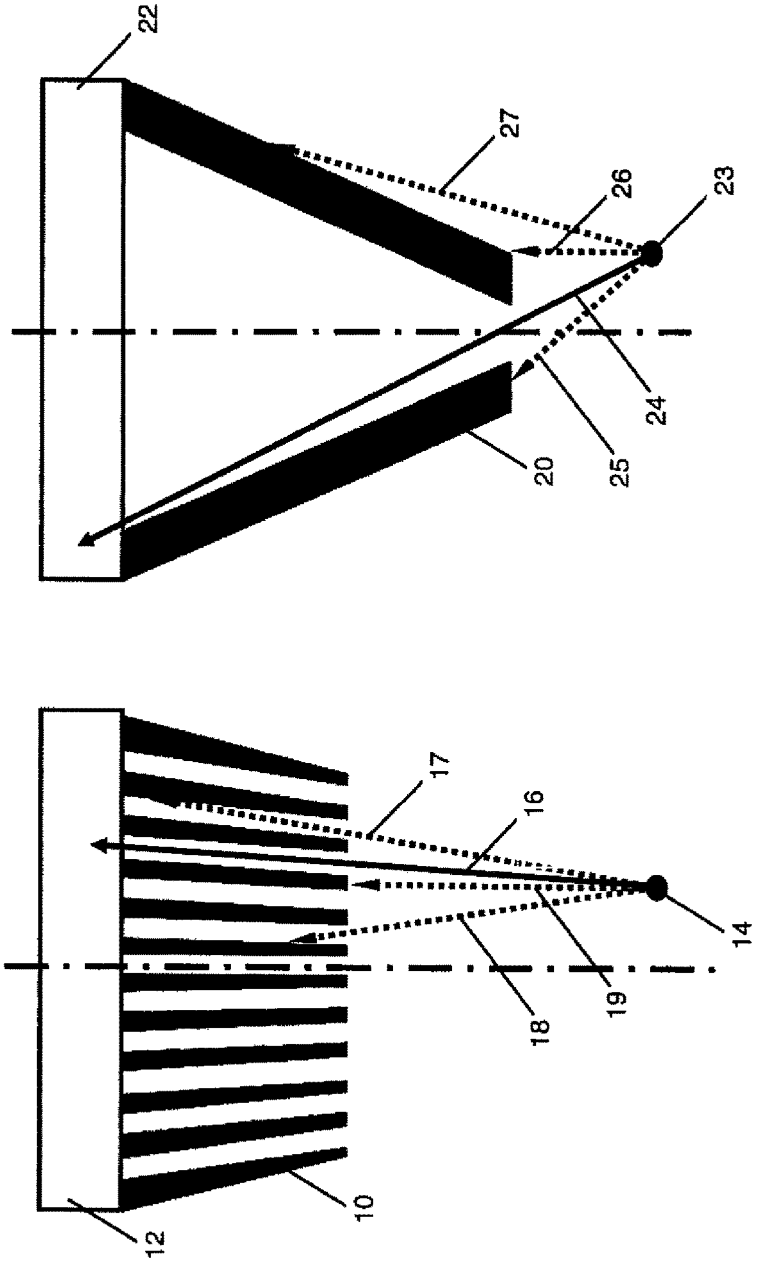
FIG. 1 is a simplified diagram of the two classical gamma camera options, on the left a gamma camera with telescope collimator, and on the right a gamma camera with pin-hole collimator.

FIG. 1 is a simplified diagram of the two classical gamma camera options, on the left a gamma camera with telescope collimator (10), formed by a plurality of parallel collimators (11) which select the direction of gamma incident on the gamma sensor (12), position-sensitive, from the sources (14) schematically displayed in the figure as a thick line (16), while the photons schematically shown in the figure as lines (17), (18) and (19) cannot reach the gamma sensor (12). In this type of detectors, the image of the gamma field generated by the gamma sensor (12) can never have a higher spatial resolution than the resolution that can be obtained on the collimation degree that can be achieved with a telescope collimator.

On the right side of the same figure, we see a gamma camera with a pin-hole collimator (20), composed of the position-sensitive gamma detector (22), which detects the incident gamma originating from the source (23), these photons are shown schematically as line (24), while the photons schematically shown in FIG. 1, such as lines (25), (26) and (27) cannot reach the gamma sensor (22), and therefore do not contribute to the image of the gamma field.

The two types of gamma cameras displayed in FIG. 1 generate the image from the collimation of outgoing gamma (16) (17) (18) and (19), and (24) (25) (26) and (27) from sources (14) and (23), which is why they generate the image by rejecting the gamma which do not go through collimators (17) (18) (19) (25) (26) and (27), and not those which can go through (16) and (24). That is to say that the higher resolution will always take a higher collimation, and therefore lower efficiency in the measurement process, which is why the measurement time will be higher depending on the desired spatial resolution for the image.

Figure 2:
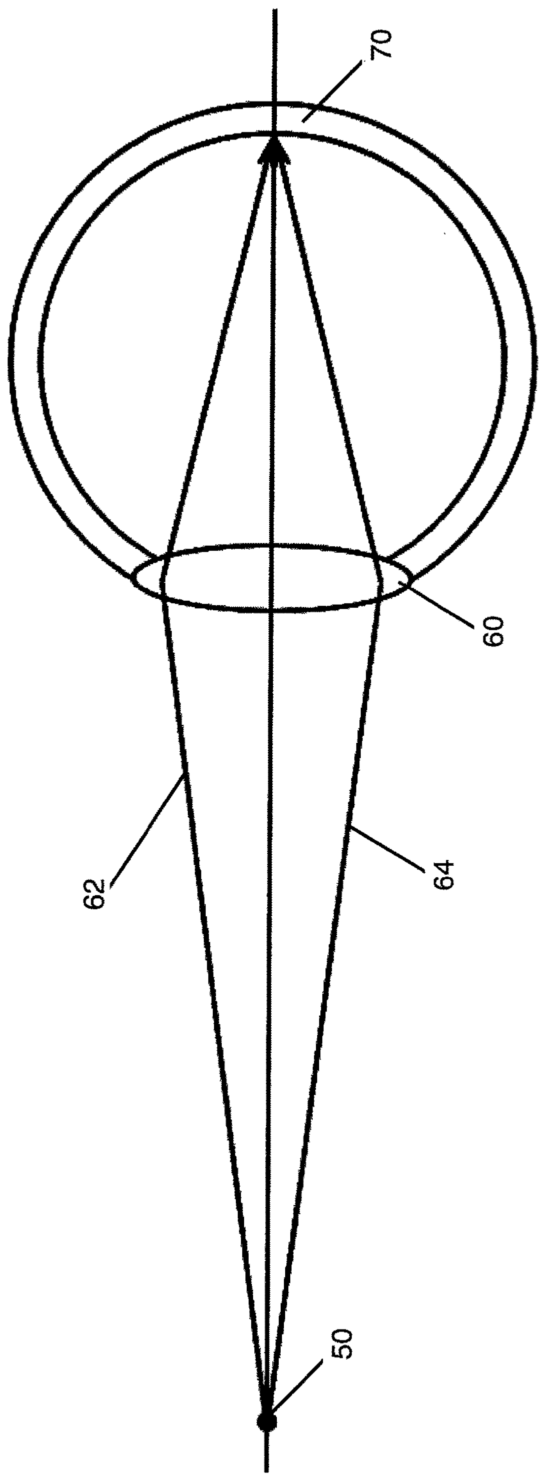
FIG. 2 is a simplified diagram of an eye similar to the human eye, where a lens of the eye is responsible for generating the image on the retina.

The imaging concept of gamma cameras is, in some aspects, similar to the type of systems used by optical cameras and the view of the human eye and the eyes of other animals, as outlined in FIG. 2. In that system, rays from the focus (50) (52), when going through the lens of the eye (60) are deflected by the refraction index and curvature radius of the lens of the eye (60), and so they change paths (62) and (64), to be finally measured by the retina located on the back of the eye (70). In the concept of human eye and optical cameras, when the object is fully in focus, the image has its maximum definition. But current gamma cameras cannot use the same concept of the lens, since the gamma radiation does not have a behavior similar to that of light when it goes through a medium with a different refraction index, but rather makes Compton, photoelectric and pair creation interactions (the latter for energies above the minimum energy required to create an electron-positron pair). The gamma field penetrates the medium continuously, depending on the cross section, generating a spatial distribution, which is also continuous, of outgoing secondary photons, with a plurality of output angles for the Compton interaction, and 2 opposite gamma photons from pairs creation. That is to say, it interacts with a plurality of positions, with a plurality of output angles, which is why it is not possible to achieve an effect similar to the lens of the eye (60) or optical cameras, because in the latter, the lens allows (when in focus) all light coming from a single external point to the view device incident on the lens to project towards the retina of the eye, also on one same spot.

Therefore, to build an image, gamma camera devices, with their collimator concepts, generate the image so that each position of gamma sensors (12) and (22), receives one only incoming radiation path. This concept is essentially slow, since the photons' count rate under real, everyday conditions will be very low, except in places with a very high rate of radiation, since the image has been generated by collimating directions, i.e., rejecting a significant fraction of the photons available in the gamma field. This is why these cameras are slow, and for many applications they require a very long time to acquire an image.

Another way to acquire an image, or in this case to make a map, since the image is obtained to be overlapped with a map or image of the land, is to use gamma detectors for geophysical studies, which are also used to locate lost gamma sources or to know the distribution of gamma radiation after an accident. These detectors are formed by a single non-collimated sensor, which in the most common commercial forms are similar to those outlined in FIG. 3. The diagram example of FIG. 3 displays a gamma detector for geophysical surveys consisting of four prismatic scintillators (110) (112) (114) (116), as a typical example, a sodium iodide activated with Thallium, 16 inches by 4 inches by 4 inches, with an approximate volume of detection of 4 liters. That crystal issues its light through the bottom face of the figure, to a photomultiplier (120) (122) (124) (126) for each detector. The signals are processed with the electronics, which acquires the signals from the four detectors and combines them to obtain a single spectrum on pulses height corresponding to the full detector, i.e., acquired by the four detectors which are part of the detector assembly. These detectors have fields of view oriented towards the direction (130) of FIG. 3, with a lobe response with a side aperture of about 50 degrees approximately in relation to the regular direction of the detector, generated because at greater angles, the geometric detection efficiency is significantly lower. These detectors are used to acquire an image or map of the radiation by placing them on an aerial vehicle with the detection face looking downwards, flying in a trajectory with a regular pattern of equidistant air lines, in order to cover the entire area to be measured. The time of acquisition of an image is very long because although the detector is very sensitive, the resulting spatial resolution is low. Then, in order to measure with a higher resolution, it has to fly at low heights, but as the lateral area covered during the flight decreases, more flights have to be carried out to cover the same area, which increases the measurement time even more.

Considering the limitations of the various types of gamma cameras and geophysical gamma detectors, another concept is proposed to obtain the image of a gamma field, which makes use of the property that gamma fields are inherently diffuse, since when you move a gamma detector for small distances, the rate count and energy spectrum does not change significantly in open places. Measurements in laboratory and confined spaces, with samples close to the detector or a shielding are very sensitive to position, but outside of this specific situation, gamma fields, both in its angular and energy dependence, vary very slightly with position.

The proposed device uses this property of gamma in relatively open spaces to carry apply another method to capture the image of the gamma field.

Figure 4:
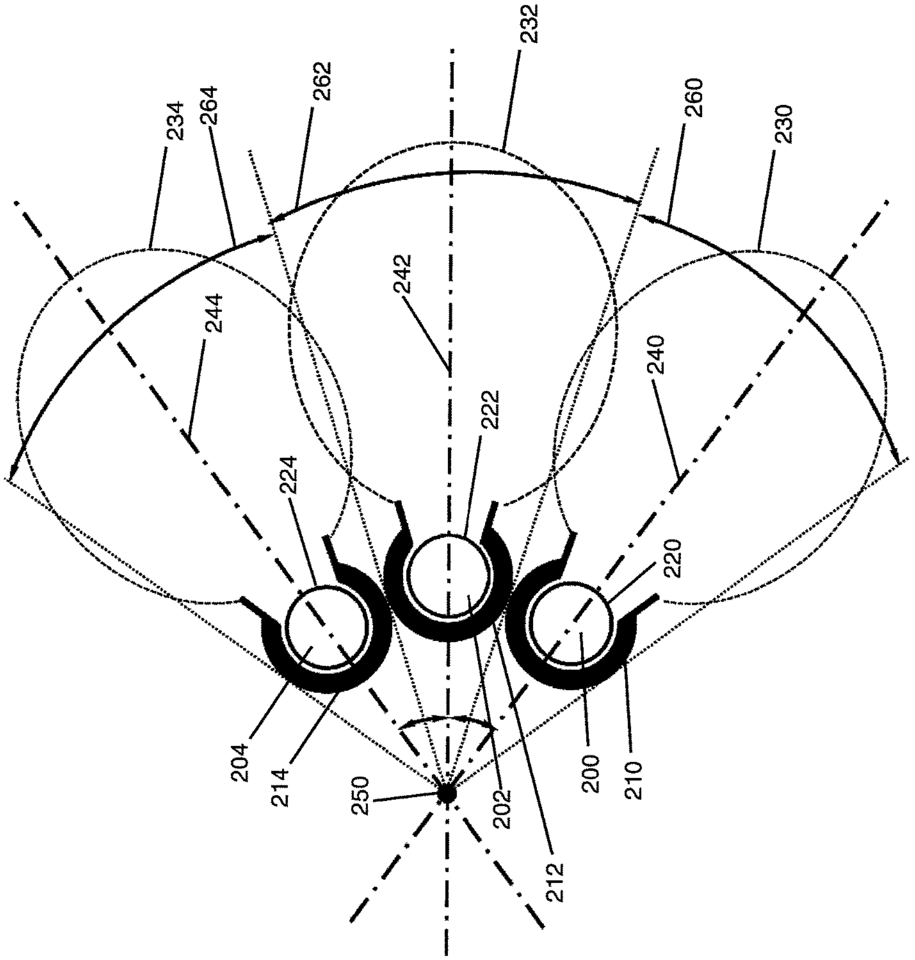
FIG. 4 is a simplified diagram of a section of three detectors located inside a single shielding for each sensor, in such a way that each detector receives the incident radiation with a direction included within a given angular sector or detection lobe.

Taking a plurality of detectors for one same device, as outlined in FIG. 4, for illustration purposes only, with three schematic gamma detectors (200) (202) (204), each detector is located inside a shielding close to the sensor (210) (212) (214), or in contact with it, which does not cover the face of the sensor (220) (222) (224). Each detector assembly—shielding, like units (200) and (210), (202) and (212), (204) and (214), form a complete unit of measurement, or gamma sensor, with its own electronics and processing. Each gamma sensor presents a response to the path of the incident gamma radiation with lobar form (230) (232) (234) in relation to the central axis of each sensor (240) (242) (244), since when the radiation separates from the central axis, the shielding and the decrease of the geometric efficiency reduce the response of the gamma sensor in the proposed device. The axes of view (240) (242) (244) of each lobe diverge in relation to the center (250)

The image of the radiation is obtained from the fact that each gamma sensor, as well as its central axes (240) (242) (244) have an angle, (252) and (254), in relation to the axis of view of the neighboring lobe, each gamma sensor then sustains a certain area of view (260) (262) and (264) with respect to the center (250).

As in most practical cases, the gamma field in a point has a slight angle variation, and is similar to the gamma field by moving the point to a short distance; for such cases the plurality of angles measured by a detector is similar to the same plurality of angles measured by another detector if the position of the second detector is close to the first detector.

For these cases, the proposed device then measures the angular response of the gamma field at one point by measuring different pluralities of angles facing different directions simultaneously at nearby positions.

It is clear that if we place a small shielding as that in FIG. 4, lobes (230) (232) and (234) of each detector may overlap, as shown schematically in FIG. 4, so that there may be gamma rays coming from an area of view that can be detected in the neighboring detector. Since the measurement lobes of each gamma sensor can be completely characterized, and as precisely as desired, the overlapping between neighboring lobes can be considered fully known, which is why it can be mathematically calculated, based on the counts rate of each detector (200) (202) and (204), the counts rate which incident on each detector from its area of view (260) (262) (264) only, subtracting the contribution of gamma from neighboring areas.

Unlike gamma cameras, each sensor receives a plurality of incoming paths of incident gamma radiation, and as the gamma sensor can be sufficiently large and efficient for many practical applications, the measurement statistics is high and there can be a very short time from one gamma image to the next.

In FIG. 4, a divergence has been considered in relation to a center (250), but different three-dimensional arrangements of gamma sensors and detection lobes may diverge in relation to a center, or several centers, or an axis, or several axes, or combinations thereof, depending on the suitability for the different uses.

Figure 5:
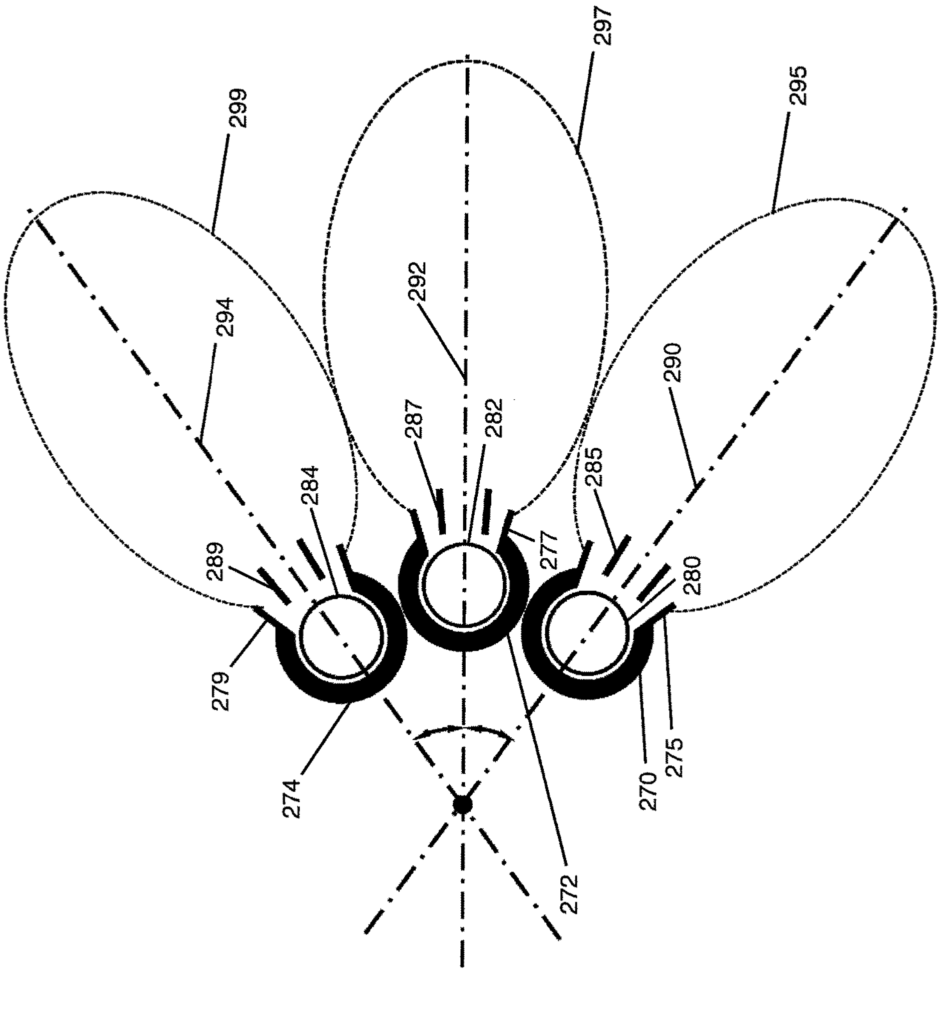
FIG. 5 is a simplified diagram of a section of three detectors located inside a single shielding as in FIG. 4, which includes divergent external and internal displays to decrease the response to gamma from areas of view from neighboring detectors.

In an alternative of the device, as that schematically shown in FIG. 5, each shielding (270) (272) (274) has additional side divergent screens (275) (277) (279) of shielding material for gamma radiation, outside the face exposed to the detection lobe (280) (282) and (284), so as to reduce the overlapping between neighboring lobes and simplifying the treatment of signals to the detector output. This side screens are quite lightweight, because the thicknesses may be relatively small, because the gamma have oblique incidence on its surface, the paths have to penetrate a shield length significantly greater than the thickness of the screen to reach the detector.

The alternative for the device in FIG. 5 also includes, with respect to FIG. 4, internal divergent screens (285) (287) and (289) to external side divergent screens (275) (277) and (279), also composed of shielding material for gamma radiation, and divergent with respect to the central axes (290) (292) and (294), but with an equal or smaller angle of divergence as compared to the angle of the external divergent screen (275) (277) and (279), to not significantly decrease the response to the gamma from the same area of view, and strongly reduce detection form areas of view from neighboring sensors. This other alternative reduces the overlapping of lobes (295) (297) (299) among neighbors and simplifies the treatment of signals of each detector.

If the use, weight, size of the device and the count rate allow this type of external and internal screens to reduce the contribution of detection from areas of view of neighboring sensors, the contribution of neighbors in terms of count rates becomes statistically irrelevant, and the counts rate of each gamma sensor correlates directly to the area of view only, without mathematical corrections of neighboring contributions.

Figure 6:
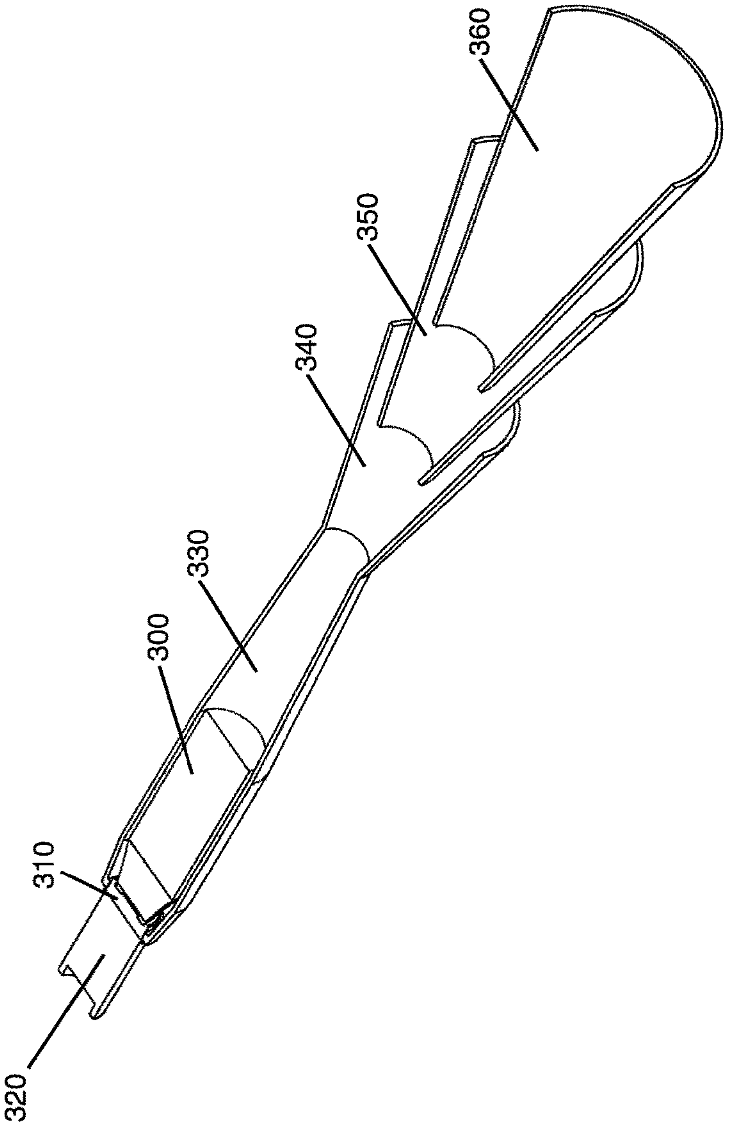
FIG. 6 is a section of an alternative for a shape of gamma sensor as those of FIG. 5, using a cylindrical scintillator, in which the detector face exposed to radiation is one of the flat faces of the detector cylinder, which has a symmetrical lobe response in relation to the axial axis of detector crystal.

FIG. 6 shows the section of an alternative shape for a gamma sensor proposed to be used in the device mentioned, composed of half cylindrical scintillator (300), and a photodiode (310), with preamp electronics (320) next to the photodiode (310). The half scintillator is surrounded by a shielding (330), and preceded, on the direction of the incoming radiation, by a side screen (340) composed of shielding material. Since the detector is a cylindrical section detector, it is convenient for this side screen to have a conic section, while to achieve a decrease in the influence of neighboring lobes, it has two internal screens, (350) and (360), also made of shielding material, which, like with cylindrical screens, shall preferably have conic section.

Figure 7:
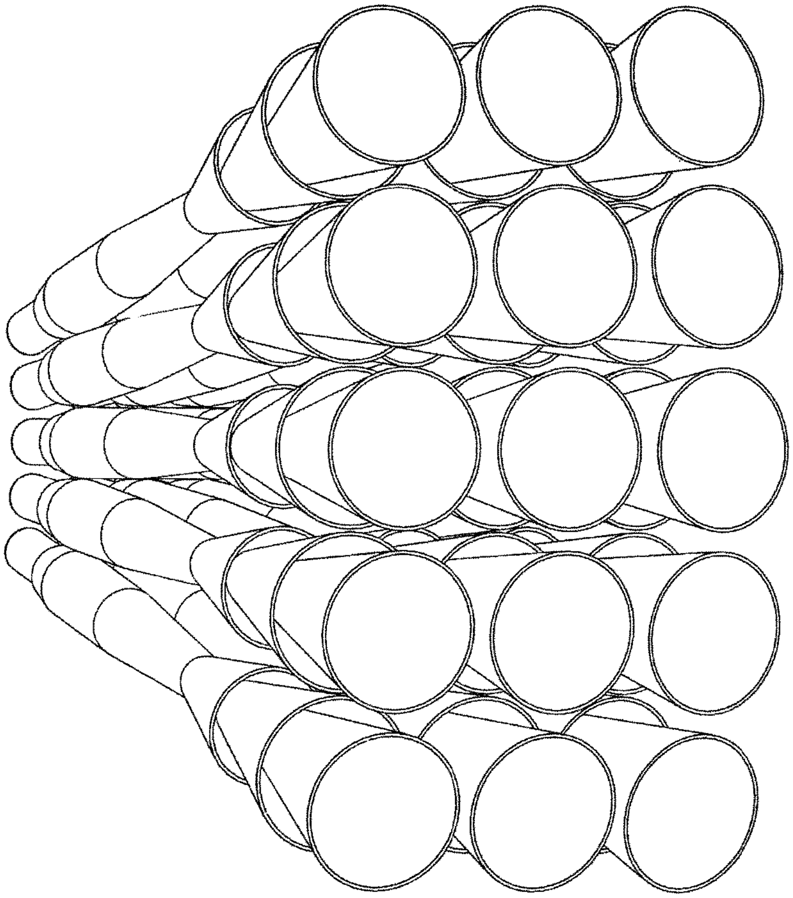
FIG. 7 is an exterior view of a device composed of an array of sensors such as those in FIG. 6, forming a gamma camera consisting of 5 horizontal and 3 vertical sensors.

FIG. 7 shows an alternative to a small device, consisting of an arrangement of gamma sensors as those in FIG. 6, forming a gamma view camera consisting of 5 horizontal and 3 vertical elements, with a side aperture of about 25 degrees and a vertical aperture about 15 degrees in relation to the central axis.

It is clear then that various mechanical dispositions, on a sphere, on a plane or on different surfaces spatially arranged, various mechanical solutions of gamma sensors that use the concept of the sensors in FIGS. 4 and 5, will produce images of the gamma field, provided that the detection lobes are divergent in relation to a center, axis or combination of one or more of these.

Figure 3:
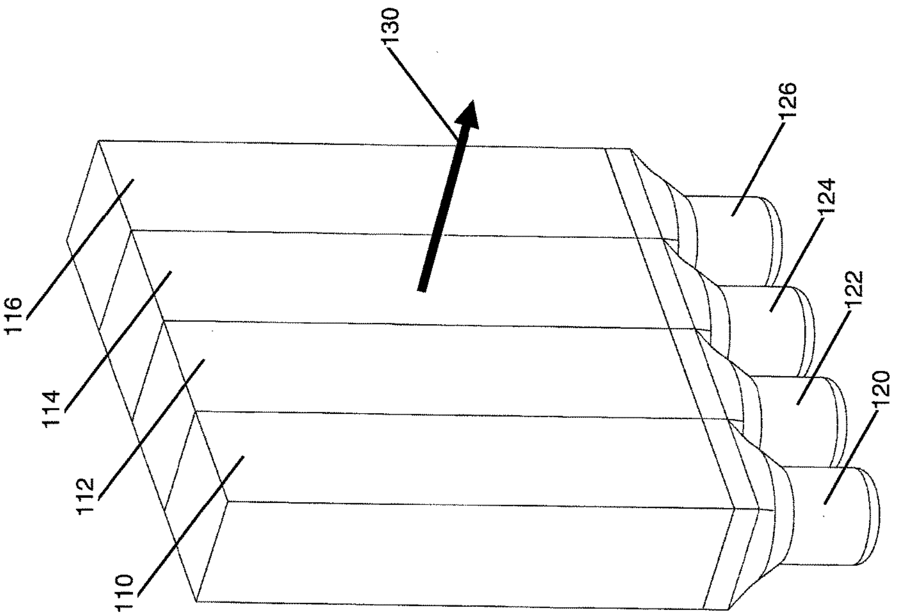
FIG. 3 is a typical diagram of a detector for geophysical measurements, composed by the union of four detectors with their scintillators and photomultipliers.

When due to the desired sensitivity large gamma detectors are used, such as scintillator crystals for geophysical prospection or search for radioactive sources, as the detectors in FIG. 3, the crystals are as efficient to the energies of gamma of greatest interest, which can be considered to almost completely absorb the incident radiation, that is to say, only a small fraction of the incoming radiation comes out to a detector, and then for outgoing radiation, the detector complies with conditions similar to a shielding. Then in this case, on the proposed device, each neighboring detector can be considered as the side shielding of the other detectors, provided the detectors are placed at the lower distance from one another. Then, for this application we can leave aside the shielding surrounding the detector and build the proposed device without side shielding. Likewise, we can leave aside the front shielding and internal and side screens to reduce the overlapping between the neighboring detection lobes and maximize sensitivity, using the naturally cosine detection lobe as the detection lobe, which is generated when the direction of the incident gamma deviates from the norm to the center of a flat face detector.

Figure 8:
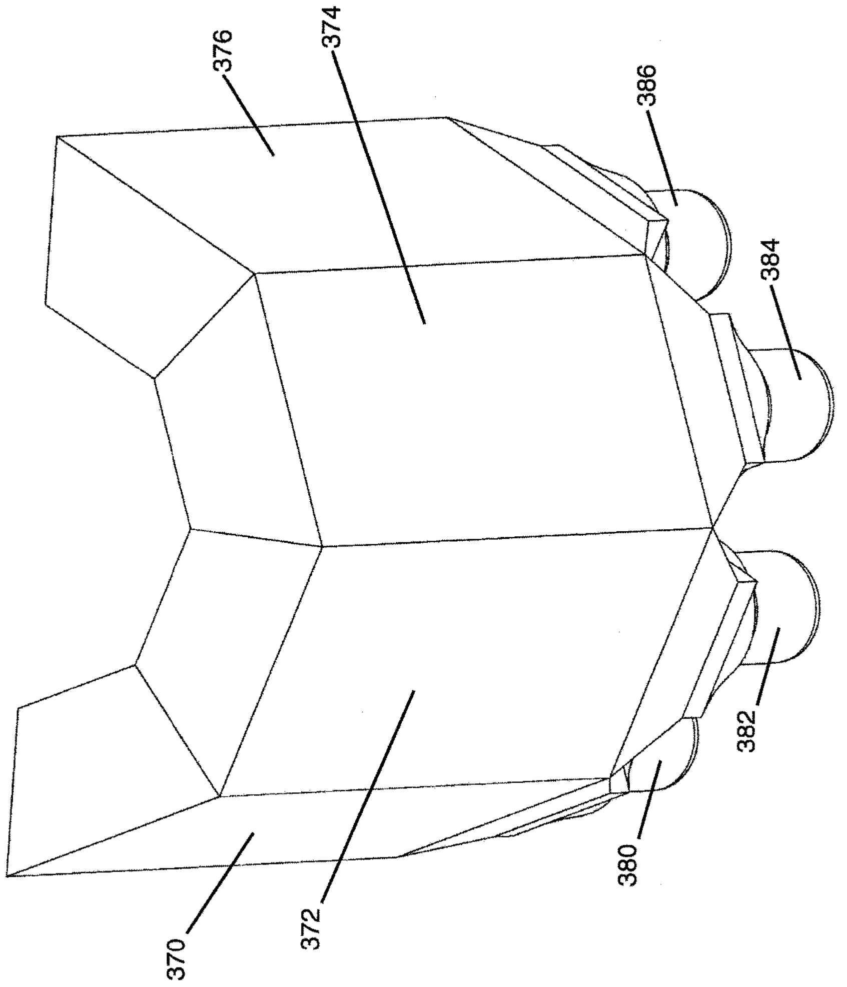
FIG. 8 is an exterior view of a device composed of an array of sensors which allows to replace the type of detector in FIG. 3, but which creates an image using sensors such as those in FIG. 4, eliminating the shielding close to each detector since, due to its large size, each detector is shielded by the neighboring detector.

An alternative to the design of the proposed device is displayed in FIG. 8, which consists of four prismatic scintillators with trapezoidal section (370) (272) (374) and (378), together, joined by their oblique sides and optically coupled with photomultipliers (380) (382) (384) and (386). It is suitable for geophysical measurements or aerial search for radioactive sources, with the advantage that it allows acquisition of a gamma image by subdividing the measurement or image in about four different angles of view covering about 180 degrees, which allows to quadruple resolution, with an even greater aperture, since it increases efficiency in relation to classical detectors, by separating for large angles with respect to the norm to the detector.

The use of large sodium iodide crystal can be very expensive, and even more so if the crystal section is not square or rectangular or cylindrical, and a trapezoidal section is required. This is why a construction alternative for the device in FIG. 8 may be specifically appropriate to be used with plastic scintillators, low-cost for large sizes. In this case, it is not possible to perform a spectrometry by pulse height of the photopeak, but it is possible to perform a spectrometry through deconvolution of Compton spectra, and in this case regain the capacity to analyze the incident photon energy spectrum, or analyze only the count rate within a certain region of the spectrum of pulse height.

Figure 9:
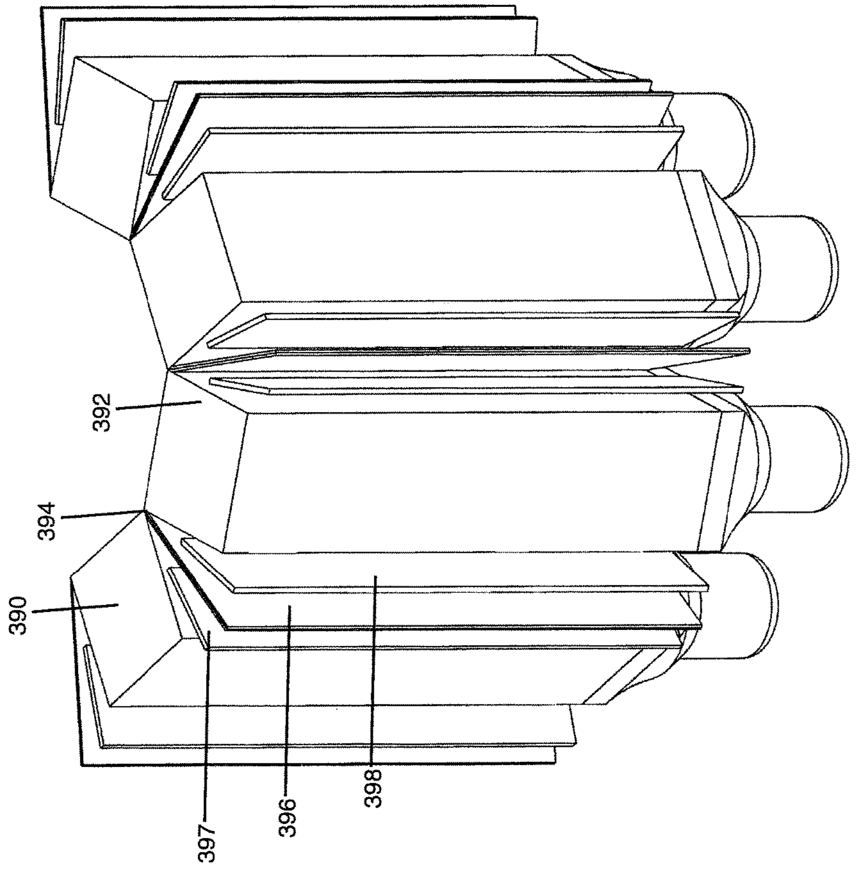
FIG. 9 is an exterior view of an alternative to the device in FIG. 8, using square section detectors combined with intermediate screens acting as a side shielding for each detector.

An alternative to the concept in FIG. 8 can be seen in FIG. 9, with a slight decrease in efficiency but with a cost reduction, is obtained by using square section detectors, as shown by detectors (390) and (392) joining them through the side of the internal vertex (394). Since part of the side shielding is lost, it is convenient to add a thin plate of shielding between the detectors in the space between two neighboring detectors, as seen in plate (396), for a lightweight and efficient design also using divergent internal side panels, as we can see in plates (397) and (398).

Figure 10:
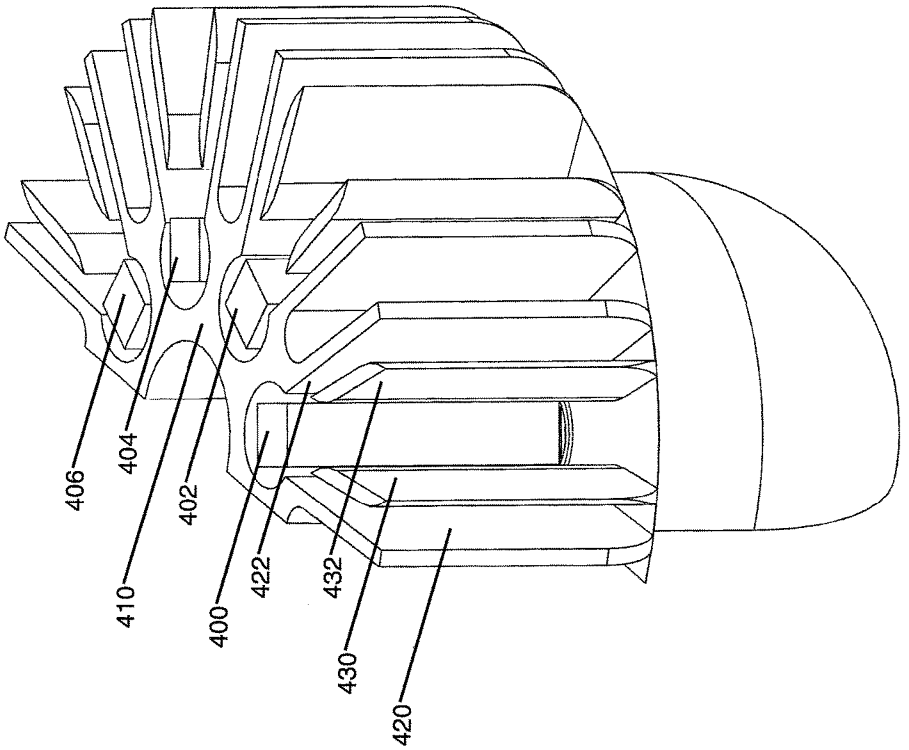
FIG. 10 is a view of a section of an example of practical application for commercial use as an area monitor, where gamma detectors are extended prisms, and the radiation enters through each of the extended faces.

An example of practical application for commercial use of the proposed device used as an area monitor can be seen in FIG. 10, where we can see a half-height section of a set of 4 gamma detectors (400) (402) (404) and (406), inside a shielding (410) which includes external and internal side deflectors (420) (422), (430) (432), applied, for instance, as those for the detector (400), so that each single sensor only significantly receives incident radiation from the southern lobe of its own angular sector.

Figure 11:
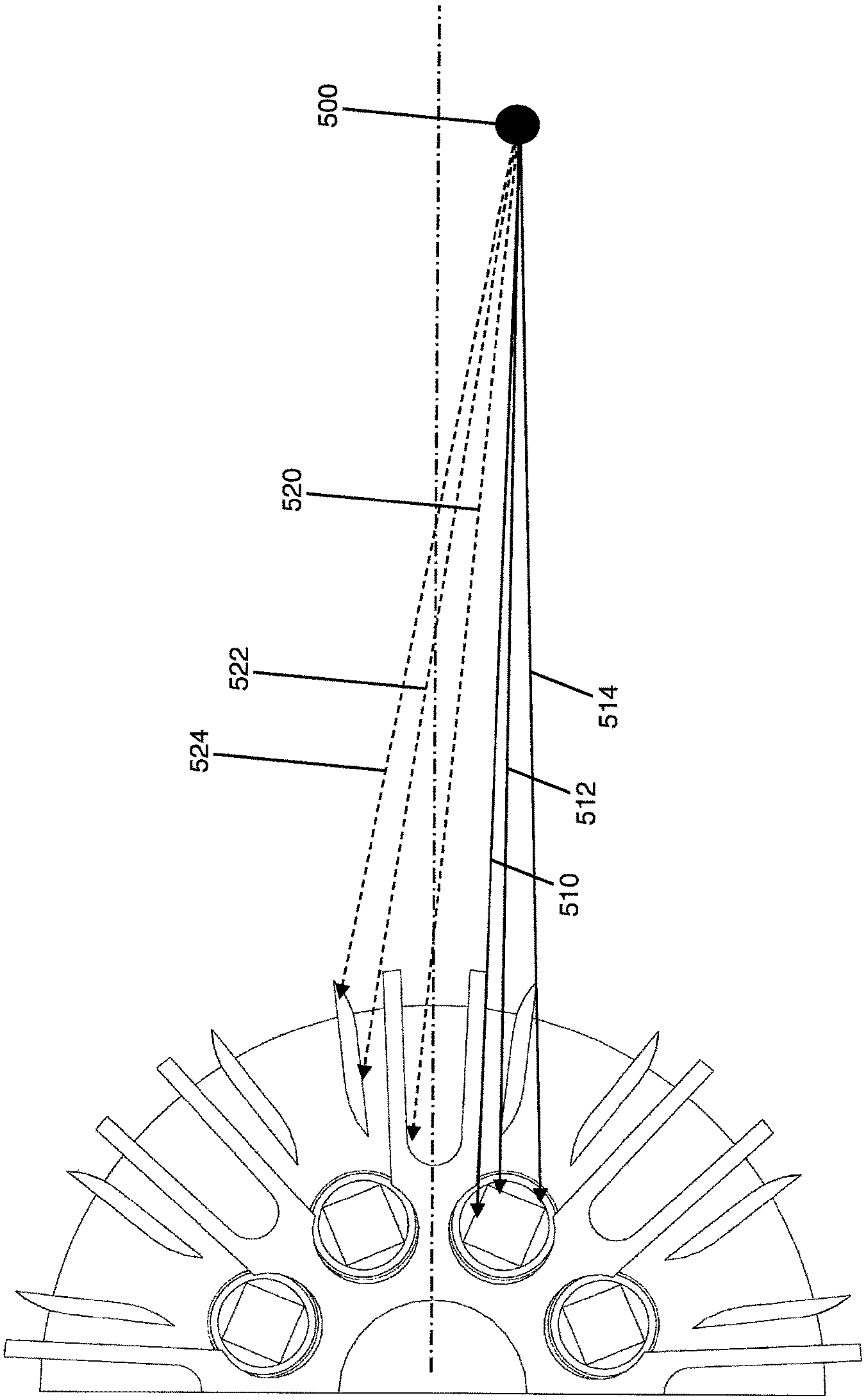
FIG. 11 is a top view of the section in FIG. 10, which schematically shows how the different directions of the incident gamma radiation affect, or not, the detector, based on the position of internal and side screens as those in FIG. 5.

The section in FIG. 8 can be seen in FIG. 11, which contains a diagram showing that for this type of device, when it is in front of the area of view, the screens design allows the radiation from a gamma source (500) to be detected only by the detector that is within its area of view, such as paths (510) (512) and (514), and not for paths (520) (522) and (524).

Figure 12:
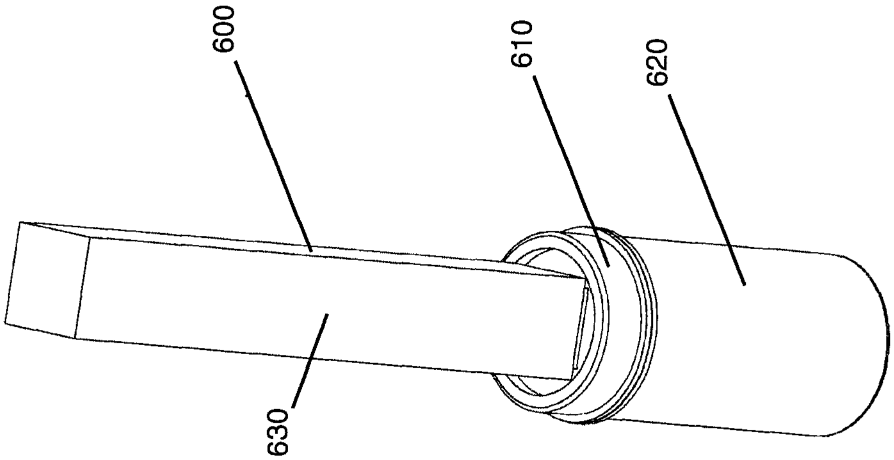
FIG. 12 is an exterior view of the gamma detectors used in FIGS. 10 and 11, where we can see the position of the photodiode and electronic amplification and preamp.

In this practical example, as shown in FIG. 12, the gamma detectors in FIGS. 10 and 11 are small scintillators (600), typically sized 10 mm×10 mm×40 mm, clear type, such as sodium iodide or cesium iodide, or plastic, or liquid scintillators, which have a photodiode (610) on one side, which is highly sensitive to visible radiation in light emission wavelengths of the scintillator, with the signal processed by a preamplifier and amplifier schematically contained inside the electronic box (620) of the same detector. In this case, the gamma sensor is used receiving the incident radiation through the side face (630), with an efficiency superior to that of a Geiger counter of similar size, but at comparatively similar costs, taking into consideration the low costs of this type of components, both crystal and plastic.

Figure 13:
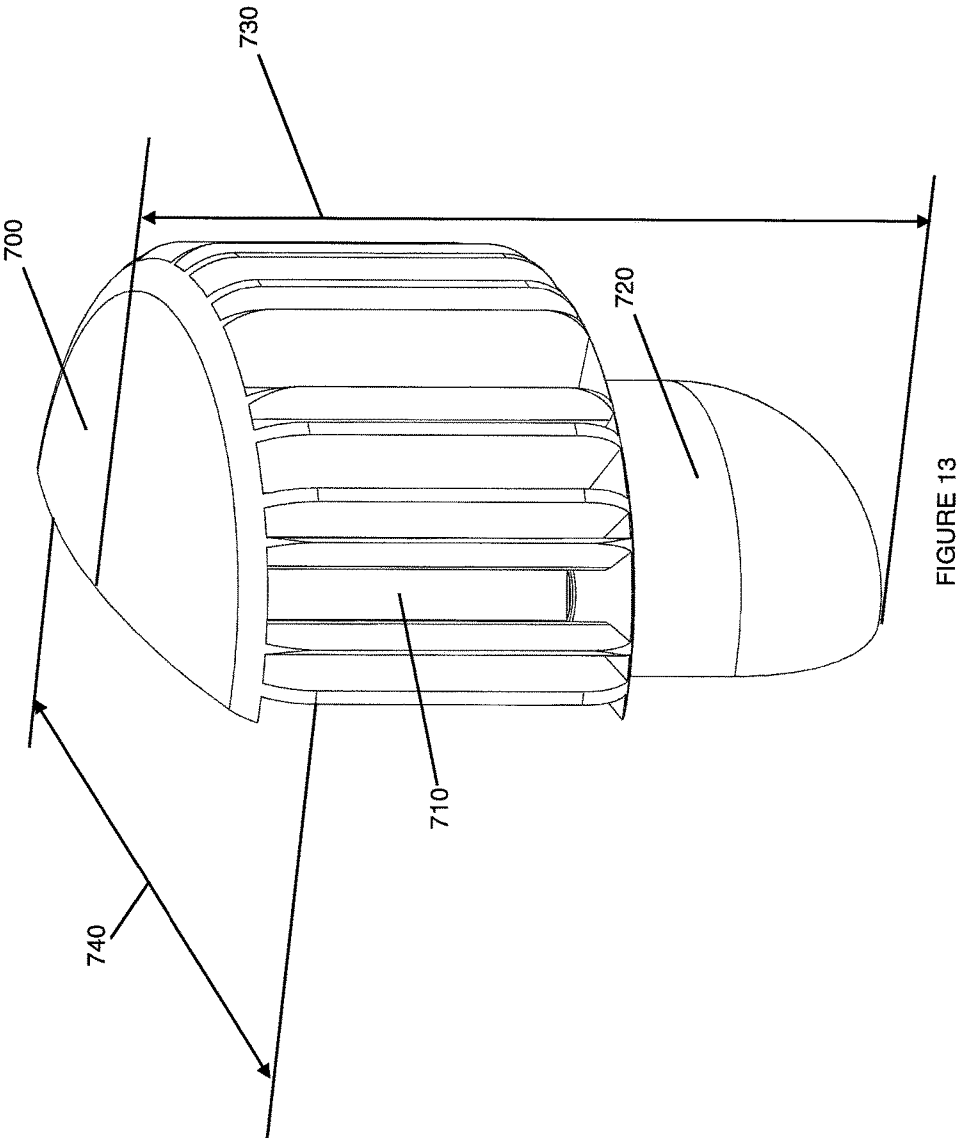
FIG. 13 is a complete exterior view of a detector as that in FIG. 10, with a field of view of approximately 180 degrees.

In this practical example, the full sensor can be seen in FIG. 13, where we can see the shielding (700), the face of the gamma sensor (710) facing the person looking at the figure, and the lower electronics box (720). In this example, the total length of the device (730) is about 12 cm, and the total width (740) is about 10 centimeters, weighing approximately 1 to 2 kg, including the lead shielding and even less for tungsten.

In the case of FIG. 13, the detector measures the gamma field with a field of view of 180 degrees, and is suitable to be placed on a wall, under a roof, or in aerial or ground vehicles.

This type of example of application of the proposed device is very useful, since as gamma fields are naturally diffuse and have little dependence with height, it is of great practical interest to make a very quick measurement of the incident radiation, only measuring its angular dependence, since as it is a device generating a high-speed gamma image it can operate in real time within 1 second or less. When using sodium iodide or cesium iodide crystals, this example of application can be also used to make a spectrometry of the signal coming from each detector.

Due to the low cost and size of this example of application, the benefits of the device proposed as an example of application can be improved with a low additional investment, overlapping the gamma count rates of southern lobes of measurement with an image obtained with an optical camera with the same field of view that the device proposed, so as to correlate the variations of the rate of radiation of each southern lobe with the objects moving in front of the sensor, taking advantage of the fact that the proposed device, because it is highly efficient, allows to produce the gamma image within 1 second or less.

In this application example, one-dimensional and in real-time, and within the same cost range as Geiger monitors, the presented device offers features that are superior to all current area monitors.

REFERENCES CITED

U.S. PATENT DOCUMENTS

Harrison H. Barrett, "Imaging system utilizing spatial coding". U.S. Pat. No. 3,748,470. July, 1973.

C. L. Larsson et al., "Directional Gamma Ray Probe". U.S. Pat. No. 7,470,909 B2. December, 2008.

Christophe Le Goaller, "Gamma Imagery Device". U.S. Pat. No. 7,772,563 B2. August 2010.

W. Enghard et al., "Detector Assembly for Detecting Radiation with Angular Resolution and Method for Operating Said Assembly". U.S. Pat. No. 8,030,617 B2. October 2011.

OTHER PUBLICATIONS

F. Kharfi: "Chapter 1—Principles and Applications of Nuclear Medical Imaging: A Survey on Recent Developments", from the book "Imaging and Radioanalytical Techniques in Interdisciplinary Research—Fundamentals and Cutting Edge", Edited by F. Kharfi. InTeach, 2013.

O. P. Ivanov, B. V. Artemiev, V. E. Stepanov, A. S. Danilovich. "Gamma-Imaging System for Ecological and Nuclear Environment Measurements". 10th European Conference on Non-Destructive Testing 2010. Moscow, Russia, Jun. 7-11, 2010.

U.S. Department of Energy "GammaCam™ Radiation Imaging System". US DoE. OST Reference #1840. Innovative Technology Summary Report. Office of Environmental Management. Office of Science and Technology. February 1998.

V. Schönfelder, A. Himer, and K. Schneider: "A telescope for soft gamma ray astronomy", Nuclear Instruments and Methods, Vol. 107, No. 2, 1973.

V. Lj. Ljubenov, P. M. Marinkovic. "Applicability of Compton Imaging in Nuclear Decommissioning Activities". International Yugoslav Nuclear Society Conference (YUNSC-2002), Belgrado, Yugoslavia, 2002.

Wonho Lee, Taewoong Lee: "A compact Compton camera using scintillators for the investigation of nuclear materials", Nuclear Instruments and Methods in Physics Research Section A: Accelerators, Spectrometers, Detectors and Associated Equipment, Vol 624, No. 1, 2010.

J. Kataoka, A. Kishimoto, T. Nishiyama, T. Fujita, K. Takeuchi, T. Kato, T. Nakamori, S. Ohsuka, S. Nakamura, M. Hirayanagi, S. Adachi, T. Uchiyama, K. Yamamoto: "Handy Compton camera using 3D position sensitive scintillators coupled with large area monolithic MPCC arrays", Nuclear Instruments and Methods in Physics Research A. Vol 732, 2013.

J. Paasche, M. Bates. "Project Report Aeromagnetic/Spectrometer Survey USGS Texas 2002". For the United States Geological Survey. May 2003.

H. Itadzu, T. Iguchi, A. Uritani, J. Kawarabayashi. "Evaluation of Response Functions of 16"×16"×4" Large-sized NaI Scintillation Detector for Environmental Gamma-ray Survey". Proceedings of the Second International Workshop on EGS", August 8-10, Tsukuba, Japan, 2000.

International Atomic Energy Agency "Guidelines for radioelement mapping using gamma ray spectrometry data". IAEA TECDOC 1363. July, 2003.

I. Halevy, P. Wasiolek. "Aerial Measuring System (AMS)/Israel Atomic Energy Commission (IAEC) Joint Comparison Study". Conference of the Nuclear Societies in Israel. Dead Sea, Feb. 11-13, 2014.

T. Torii, Y. Sanada. "Radiation measurement by unmanned aircraft after Fukushima Daiichi nuclear power plant accident". Remotely Piloted Aircraft System Symposium. ICAO Headquarters, Montreal, Canada. Mar. 23-25, 2015.

What is claimed is:

1. A device for gamma imaging of radiation fields comprising: a plurality of gamma detectors, wherein each gamma detector is covered by an exterior shielding and comprises a pair of projecting side screens, the shielding including an opening such that an outwardly facing surface portion of each gamma detector of the plurality of gamma detectors is unshielded, wherein each outwardly facing surface portion of each gamma detector has a divergent field of view allowing radiation of a plurality of angles of incidence to enter each gamma detector, and wherein the pair of projecting side screens diverge in a direction toward the field of view with respect to a central axis of each gamma detector.

2. The device for gamma imaging of radiation fields, according to claim 1, wherein the side screens comprise gamma radiation shielding material.

3. The device for gamma imaging of radiation fields, according to claim 2, wherein within a volume generated by the projection of the outwardly facing surface portion of each gamma detector of said device has internal side screens comprising gamma radiation shielding material, the internal side screens diverge in the direction toward the field of view with respect to the central axis of each gamma detector.

4. The device for gamma imaging of radiation fields, according to claim 1, wherein each gamma radiation detectors comprise scintillators optically coupled to photo diodes of high sensitivity and low noise for a wavelength of light emitted by the scintillator when interacting with a gamma photon.

5. The device for gamma imaging of radiation fields, according to claim 2, wherein the gamma radiation detectors comprise scintillators optically coupled to photo diodes of high sensitivity and low noise for a wavelength of light emitted by the scintillator when interacting with a gamma photon.

6. The device for gamma imaging of radiation fields, according to claim 3, wherein the gamma radiation detectors comprise scintillators optically coupled to photo-diodes of high sensitivity and low noise for a wavelength of light emitted by the scintillator when interacting with a gamma photon.

7. The device for gamma imaging of radiation fields, according to claim 1, wherein the gamma radiation detectors are large scintillators arranged side by side, in such a way that each gamma detector shields a neighboring gamma detector from radiation which, due to its direction, would have an incidence on the gamma detector, while also going through to the neighboring gamma detector.

8. The device for gamma imaging of radiation fields, according to claim 7, wherein each gamma detector comprises side shielding between neighboring gamma detectors to shield from radiation which, due to its course, would have an incidence on one of the gamma detectors coming from the area where the other gamma detector is, and which due to its shape and size, does not have shielding capacity.

9. The device for gamma imaging of radiation fields, according to claim 4, wherein the scintillators comprise parallel-sided cylindrical volumes and are coupled to the photodiodes by one parallel side, and wherein the radiation has an incidence with a plurality of angles by a non-shielded angular section of a cylindrical side surface.

10. The device for gamma imaging of radiation fields, according to claim 5, wherein the scintillators comprise parallel-sided cylindrical volumes and are coupled to the scintillator photodiodes by one parallel side, and wherein the radiation has an incidence with a plurality of angles by a non-shielded angular section of the cylindrical side surface.

11. The device for gamma imaging of radiation fields, according to claim 6, wherein the scintillators comprise parallel-sided cylindrical volumes and are coupled to the scintillator photodiodes by one parallel side, and wherein the radiation has an incidence with a plurality of angles by a non-shielded angular section of the cylindrical side surface.

12. The device for gamma imaging of radiation fields, according to claim 1, wherein an image obtained from the gamma detectors overlaps with an image produced by an optical camera with the same field of view of the set of gamma detectors.

13. The device for gamma imaging of radiation fields, according to claim 2, wherein an image obtained from the gamma detectors overlaps with an image produced by an optical camera with the same field of view of the set of gamma detectors.

14. The device for gamma imaging of radiation fields, according to claim 3, wherein an image obtained from the gamma detectors overlaps with an image produced by an optical camera with the same field of view of the set of gamma detectors.

15. The device for gamma imaging of radiation fields, according to claim 4, wherein an image obtained from the gamma detectors overlaps with an image produced by an optical camera with the same field of view of the set of gamma detectors.

16. The device for gamma imaging of radiation fields, according to claim 5, wherein an image obtained from the gamma detectors overlaps with an image produced by an optical camera with the same field of view of the set of gamma detectors.

17. The device for gamma imaging of radiation fields, according to claim 6, wherein an image obtained from the gamma detectors overlaps with an image produced by an optical camera with the same field of view of the set of gamma detectors.

18. The device for gamma imaging of radiation fields, according to claim 7, wherein an image obtained from the gamma detectors overlaps with an image produced by an optical camera with the same field of view of the set of gamma detectors.

19. The device for gamma imaging of radiation fields, according to claim 8, wherein an image obtained from the gamma detectors overlaps with an image produced by an optical camera with the same field of view of the set of gamma detectors.

* * * * *